United States Patent [19]

Geerings et al.

[11] Patent Number: 4,697,046
[45] Date of Patent: Sep. 29, 1987

[54] TELETEXT SIGNAL PROCESSING CIRCUIT FOR A TELETEXT RECEIVER

[75] Inventors: Michaël P. W. Geerings; Wilhelmus J. Christis; Wilhelmus F. Fekkes; Herman J. R. Schmitz, all of Eindhoven, Netherlands

[73] Assignee: U.S. Philips Corporation, New York, N.Y.

[21] Appl. No.: 918,176

[22] Filed: Oct. 10, 1986

[30] Foreign Application Priority Data

Oct. 10, 1985 [NL] Netherlands .......................... 8502766

[51] Int. Cl.⁴ .................. H04L 13/08; H04L 15/24
[52] U.S. Cl. ........................................ 178/1; 178/17.5; 178/25
[58] Field of Search ............... 178/25, 4, 17 R, 17.5, 178/1, 23 R; 358/78

[56] References Cited

U.S. PATENT DOCUMENTS 4,075,422  2/1978  Baker ..................... 178/23 R

Primary Examiner—Stafford D. Schreyer
Attorney, Agent, or Firm—Thomas A. Briody; William J. Street; Gregory P. Gadson

[57] ABSTRACT

In order to obtain fast and simple processing of a recieved page address (65, 67, 69) into a write command (95) for a multi-page memory (99) of a teletext processing circuit, a page-number memory (81) is used which can be addressed by the received page address and in which a write command for the multi-page memory is stored for the desired pages.

4 Claims, 1 Drawing Figure

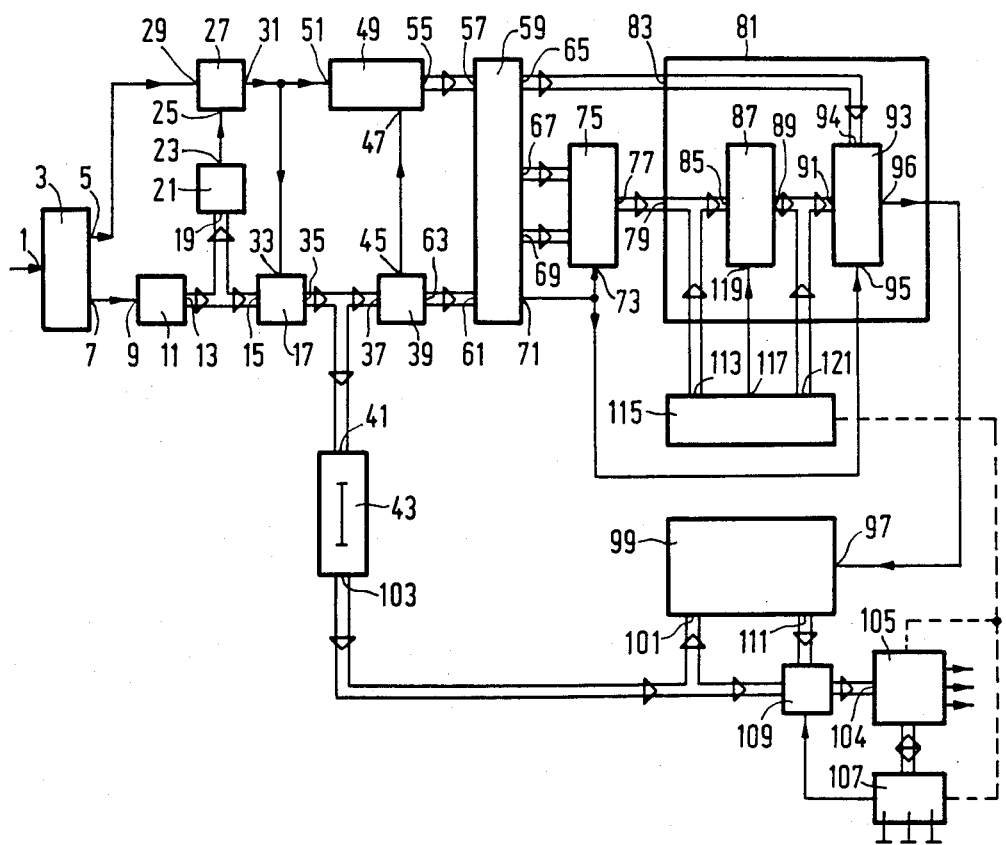

4,697,046

TELETEXT SIGNAL PROCESSING CIRCUIT FOR A TELETEXT RECEIVER

BACKGROUND OF THE INVENTION

The invention relates to a teletext signal processing circuit for a teletext receiver having a page-address selection circuit for the selection of a received page address from a received teletext signal and a multi-page memory which can be written into with received teletext information of pages determined by a page-number memory.

A teletext signal processing circuit of the type described above is known from I.E.E.E. Transactions on Consumer Electronics, Vol. CE-30, no. 3, August 1984, pages 442-446. As has been indicated on pages 443, the page-number memory may be filled in several ways with numbers or addresses of pages which must be stored in the multi-page memory. A circuit must then be provided which indicates whether received teletext information is associated with a page whose number or page address is present in the page-number memory.

For such a circuit a comparison circuit may be used which may operate serially or in parallel. A serial comparison of received page addresses with numbers stored in the page-number memory is time-consuming, while a parallel comparison requires a large number of comparison circuits.

SUMMARY OF THE INVENTION

It is an object of the invention to provide a teletext signal processing circuit with which it can be determined in a quick and simple manner whether received page addresses are associated with pages whose information must be written into the multi-page memory.

To this end, a teletext signal processing circuit of the type described in the opening paragraph is characterized in that for obtaining a write command for the multi-page memory, the page-number memory is read by a received page address obtained from an output combination of the page-address selection circuit.

Simple and fast page-address processing can be obtained by making the page-number memory addressable by means of the received page address so that the page-number memory supplies a write command for the multi-page memory when a page address of a page to be written in said multi-page memory is received.

It is to be noted that it is known from U.S. Pat. No. 4,075,422 to generate a temporary stop command for a counter of an automatic page selector for a teletext transmitter by means of a memory for page and channel numbers which is addressable by means of the counter.

A further elaboration of the invention is characterized in that the page-number memory comprises a memory circuit for eight-bit words for each possible combination of tens digit and units digit of required page addresses and a selection circuit controllable by the hundreds digit of a received page address for the selection of the bit value in the bit position corresponding to said hundreds digit in the eight-bit word for the relevant combination of tens and units digits. A circuit is thereby obtained which is particularly suitable for a teletext system in which the hundreds digit of the page number is transmitted as a "magazine" number separated from the tens and units digits.

The page-number memory may comprise a fixed programmed read-only memory (ROM) or a programmable memory. A programmable memory may be programmed in different manners such as, for example, by the user or automatically, for example, by received teletext information or adapted to the user's customs.

DESCRIPTION OF THE DRAWINGS

The invention will now be described with reference to the drawing which comprises one FIGURE only.

The FIGURE illustrates by way of a block diagram a possible embodiment of a teletext signal processing circuit according to the invention.

Irrelevant details have been omitted. For these details reference is made to literature on commercially available integrated circuits such as, for example, Electronic Components and Applications Vol. 6, no. 1, 1984 pages 15-29.

DETAILED DESCRIPTION

In the FIGURE a television signal comprising a teletext signal is applied to an input 1 of a separating circuit 3. The separating circuit 3 which may be, for example, of the SAA 5230 type supplies a clock signal at an output 5 and a data signal at an output 7.

The data signal at the output 7 of the separating circuit 3 is applied to an input 9 of a series-parallel converter 11 an output 13 of which is connected to an input 15 of a data word memory 17 and to an input 19 of a framing code detector 21.

An output 23 of the framing code detector 21 is connected to an input 25 of a data word synchronizing circuit 27 an input 29 of which receives the clock signal from the output 5 of the separating circuit 3. An output 31 of the data word synchronizing circuit supplies a storage command per data word at an input 33 of the data word memory 17 so that a received data word is present at an output 35 thereof in the time interval between two successive storage commands.

The output 35 of the data word memory 17 applies the data words to an input 37 of a Hamming code detection circuit 39 and to an input 41 of a delay circuit 43. An output 45 of the Hamming code detection circuit 39 applies a signal to an input 47 of a gating signal generator 49 indicating that a detected Hamming code is correct.

The gating signal generator 49 also has an input 51 which is connected to the output 31 of the data word synchronizing circuit 27. The gating signal generator 49 applies via an output combination 55 thereof a plurality of gating signals to an input combination 57 of a page-address selection circuit 59, an input 61 of which receives corrected data words from an output 63 of the Hamming code detection circuit 39.

The page-address selection circuit 59 applies a three-bit number to an output 65, which number indicates the hundreds digit, hereinafter, sometimes referred to as magazine number, of the page address, a four-bit number to an output 67 indicating the tens digit and a four-bit number to an output 69 indicating the units digit. When a row address zero occurs, an output 71 of the page-address selection circuit 59 supplies a signal giving a write command to an input 73 of a memory circuit 75 in which the tens and units digits of the page address originating from the outputs 67 and 69 of the page-address selection circuit 59 are stored until the next row address zero occurs.

An output 77 of the memory circuit 75 applies a seven bit combination to an input 70 of a page-number memory circuit 81, which combination represents the tens and units digits of a received page address, while the output 65 of the page-address selection circuit 59 applies a three-bit combination to an input 83 of the page-number memory circuit 81, which combination represents the hundreds digit of this page address.

The input 79 of the page-number memory circuit 81 is connected to an address input 85 of a memory circuit 87. In this case the memory circuit 87 is a random access memory (RAM) for the storage of one hundred and twenty-eight words of eight bits. One hundred of these eight-bit words each correspond to a respective one of the one hundred combinations of tens and units digits of a page number. At each position in a word corresponding to a hundreds digit associated with its combination of tens and units digits of a page number, for which writing in a multi-page memory is desired, the relevant bit has a value which corresponds to a write command. When an address is applied to the input 85 an eight-bit word is produced at an output 89 of the memory circuit 87, which word is applied to an input 91 of a selection circuit 93 whose input 94 receives the three-bit hundreds digit of the page address, i.e. the magazine number, originating from the input 83 of the page-number memory circuit 81.

At the instant of occurrence of the row address zero signal originating from the output 71 of the page-address selection circuit 59 and applied to an input 95 of the selection circuit 93, this selection circuit selects from the eight-bit word at its input 91 the bit of the eight-bit word whose position in the word corresponds to the magazine number applied to the input 94 and stores it in a just reset addressable eight-bit register in a position corresponding to this magazine number. The relevant bit may have, for example, a value corresponding to a write command. Whenever the same magazine number occurs between the occurrence of two row address zero signals, the eight-bit register applies a write command to an output 96 of the selection circuit 93, which command is applied to an input 97 of a multi-page memory 99.

At that instant the input 101 of the multi-page memory 99 receives the commencement of the line of teletext information with the desired page number from an output 103 of the delay circuit 43 so that this information is written into the multi-page memory.

The multi-page memory 99 may be, for example, a serial memory as described in the previously mentioned article in IEEE Transactions on Consumer Electronics, August 1984, pages 442–446.

An input 104 of a teletext decoder 105 first receives the signal from an output 111 of the multi-page memory 99 when a page number is selected with the aid of an operating circuit 107 via a change-over switch 109, and when the information of the desired page is not stored, it receives the signal from the output 103 of the delay circuit 43.

The address input 85 of the memory circuit 87 is also connected to an output 113 of a write circuit 115 an output 117 of which is connected to a write-read command signal input 119 of the memory circuit 87 and an output 121 of which is connected to the output 89 of the memory circuit 87. When a write command occurs at the output 117 of the write circuit 115, this output 89 serves as an input for a word to be written in the memory circuit 87, which word originates from the output 121 of the write circuit 115 at an address which is applied to the input 85 from the output 113 of the write circuit 115. If desired, this may be effected under the influence of the operating circuit 107 or under the influence of data present in the teletext information. This is indicated by broken lines in the FIGURE.

When the page number memory 81 is formed as a read-only memory, the write circuit 115 is of course omitted.

If desired, the memory circuit 87 may be formed, for example as a one thousand and twenty-four bit memory which can be addressed with a ten-bit page address. The above described embodiment is generally more favorable as far as its price is concerned. It will be evident that, if desired, functions of parts of the circuit can be fulfilled by a microprocessor.

What is claimed is:

1. A teletext signal processing circuit for a teletext receiver comprising a page-address selection circuit for the selection of a received page address from a received teletext signal; and a multi-page memory which can be written into with received teletext information of pages determined by a page-number memory, wherein for obtaining a write command (output 96) for the multi-page memory (99, input 97) the page-number memory (81) is read by a received page address obtained from an output combination (65, 67, 69) of the page-address selection circuit (59).

2. A teletext signal processing circuit as claimed in claim 1, wherein the page-number memory can be written into by means of a write circuit (115) with a write command for the multi-page memory in positions corresponding to page numbers of pages whose storage in the multipage memory (99) is desired.

3. A teletext signal processing circuit as claimed in claim 1 or 2, wherein the page-number memory (81) comprises a memory circuit (87) for eight-bit words for each possible combination of tens digit and units digits required for page addresses, and a selection circuit (93) controllable by the hundreds digit of a received page address (input 95) for the selection of the bit value in the bit position corresponding to said hundreds digit in the eight-bit word (input 91) for the relevant combination of tens and units digits.

4. A teletext signal processing circuit as claimed in claim 3, wherein the memory circuit (87) is a random access memory having a number of word positions corresponding to the possible number of combinations of tens and units digits occurring in the desired page addresses, which memory is written with words in which the bits in positions coresponding to the hundreds digit of the desired page addresses have a value corresponding to a write command.

* * * * *